2,817,632

SIDE-CHAIN HALOGENATION OF AROMATIC HYDROCARBONS

Rowland H. Mayor, Cuyahoga Falls, Ohio, assignor to The Goodyear Tire & Rubber Company, Akron, Ohio, a corporation of Ohio No Drawing. Application September 28, 1954
Serial No. 458,981

8 Claims. (Cl. 204—163)

This invention relates to the halogenation of aromatic compounds containing one or more aliphatic side-chains. More particularly this invention relates to a method of halogenating such materials by which nuclear substitution is minimized or completely inhibited and halogenation occurs substantially completely in the aliphatic side-chain even though the halogenation is carried out in the presence of "halogen-carriers" which normally cause nuclear substitution.

The selective side-chain halogenation of araliphatic materials such as toluene or xylene is a well-known general procedure. Usually this type of reaction is carried out in glass apparatus in the presence of light but in the absence of metallic ions. However, if a "halogen-carrier" such as iron is present, the mixture quickly becomes black, and chlorine absorption is slowed down or completely prevented. In addition to discoloration, tar formation, nuclear substitution, and other undesirable effects are obtained when the halogenation is carried out in the presence of iron, or iron compounds, or other "halogen-carriers."

It is an object of this invention to provide a method of preventing the discoloration of aliphatic-substituted aromatic compounds in the side-chain halogenation of such compounds even though a metal "halogen-carrier," such as iron, be present.

Another object of this invention is to provide a catalyst which directs substitution to the aliphatic side-chain of aliphatic-substituted aromatic compounds during the course of halogenation reactions and which substantially prevents nuclear substitution.

Still another object of this invention is to provide a method of halogenating aliphatic-substituted aromatic compounds in the presence of iron, or in iron equipment, in which substitution of the halogen takes place substantially completely in the aliphatic side-chains.

Another object of this invention is to provide a catalyst which inhibits the deleterious effect of iron and its compounds.

According to this invention, aliphatic-substituted aromatic compounds are halogenated in the presence of light and in the presence of hexamethylene tetramine to give products in which the halogenation is effected substantially completely in the side-chains and nuclear halogenation is minimized or completely prevented, even though a metal "halogen-carrier," such as iron or iron compounds, be present.

The practice and efficacy of the invention are illustrated by the following example:

Example

A one-liter three-neck flask was equipped with a stirrer made of iron wire, a chlorine inlet tube and a condenser. Two hundred grams of metaxylene containing 0.2 gram of hexamethylene tetramine were added to the flask. The charge was heated to a temperature of 125 to 150° C. and the temperature was maintained in this range while chlorine was bubbled into the charge as rapidly as it could be absorbed. During the chlorination the mixture was illuminated with a 150-watt light. At the end of three hours an additional 0.2 gram of hexamethylene tetramine was added and chlorination was continued. At 26½ hours, 95% of the theoretical quantity of chlorine had been absorbed. The product, after degassing and distillation, gave a yield of 470 grams (80%) of exo-hexachlorometaxylene having a distillation range of 113 to 116° C. at one millimeter mercury pressure.

When such a chlorination is carried out in the presence of iron but without hexamethylene tetramine, the mixture changes color from orange to brown and at the end of about two hours is nearly black. Chlorine absorption virtually stops at the dark brown stage.

Thus, this invention provides a method of carrying out side-chain halogenation of aliphatic-substituted aromatic hydrocarbons under conditions which normally induce nuclear halogenation. By the method of this invention nuclear halogenation is prevented and the production of these side-chain halogenated products can be more readily carried out on a commercial scale, even in the presence of iron or using iron equipment.

The amount of the hexamethylene tetramine catalyst used may be varied over a wide range. As little as 0.1% based on the weight of the aliphatic-substituted aromatic compound can be used, but usually the amount needed will be from 0.2 to 10%. The amount of hexamethylene tetramine required for protection against the deleterious effects of a "halogen-carrier" is dependent upon the amount and the form of the "halogen-carrier." For example, soluble iron compounds or finely-divided iron powder require more of the hexamethylene tetramine catalyst for successful side-chain halogenation than does a single large piece of iron metal. During the chlorination of metaxylene 0.10% by weight of hexamethylene tetramine, based on the metaxylene, is sufficient when an iron wire stirrer is used to agitate the halogenation mixture. However, if a small amount of iron powder or ferric chloride is added to the halogenation mixture, 5 to 10 parts by weight of hexamethylene tetramine, based on the weight of iron powder or ferric chloride, are required to inhibit the effect of the added iron or iron chloride and to give a successful halogenation reaction in which the halogenation occurs substantially completely in the side-chain.

The invention has been illustrated with respect to the chlorination of metaxylene. It can also be used with orthoxylene and paraxylene.

The invention has been particularly illustrated with respect to chlorination, but it can be used in bromination reactions also. The side-chain halogenation of aliphatic-substituted aromatic compounds can be readily accomplished by the method of this invention and it is a method of general application for the side-chain halogenation of aliphatic-substituted aromatic compounds.

The above example illustrates the invention for halogenation reactions carried out in the presence of iron and iron compounds. It is also applicable to halogenation reactions in which other materials which catalyze or promote nuclear halogenation are present. Examples of other such materials with which the method of the invention is effective are "halogen-carriers" such as aluminum trichloride, antimony trichloride and, in general, the trivalent metal ions and other catalysts which are well known in the art.

While certain representative embodiments and details have been shown for the purpose of illustrating the invention, it will be apparent to those skilled in this art that various changes and modifications may be made therein without departing from the spirit or scope of the invention.

I claim:

1. A process for effecting the side-chain halogenation of an aromatic hydrocarbon compound containing aliphatic side chains in the presence of a material which catalyzes nuclear halogenation and in the presence of light, which comprises heating and reacting said aromatic compound with a halogen selected from the group consisting of chlorine and bromine in the presence of hexamethylene tetramine.

2. A process for effecting the side-chain chlorination of an aromatic hydrocarbon compound containing aliphatic side chains in the presence of a material which catalyzes nuclear halogenation and in the presence of light, which comprises heating and reacting said aromatic compound with chlorine in the presence of hexamethylene tetramine.

3. A process for effecting the side-chain bromination of an aromatic hydrocarbon compound containing aliphatic side chains in the presence of a material which catalyzes nuclear halogenation and in the presence of light, which comprises heating and reacting said aromatic compound with bromine in the presence of hexamethylene tetramine.

4. A process for effecting the side-chain chlorination of a xylene in the presence of a material which catalyzes nuclear halogenation and in the presence of light, which comprises heating and reacting said xylene with chlorine in the presence of hexamethylene tetramine.

5. A process according to claim 4 in which the xylene is orthoxylene.

6. A process according to claim 4 in which the xylene is metaxylene.

7. A process according to claim 4 in which the xylene is paraxylene.

8. A process for effecting the side-chain chlorination of a xylene which comprises heating and reacting said xylene with chlorine in the presence of a material which catalyzes nuclear halogenation and in the presence of light at a temperature of 125–150° C. in the presence of from 0.1 to 10% by weight of said xylene of hexamethylene tetramine.

References Cited in the file of this patent

UNITED STATES PATENTS 2,430,822     Nevison _____ Nov. 11, 1947